Patented May 15, 1923.

1,455,728

UNITED STATES PATENT OFFICE.

HEINZ HORST, OF UERDINGEN-ON-THE-RHINE, GERMANY, ASSIGNOR TO GESELL-SCHAFT FÜR MASCHINELLE DRUCKENTWASSERUNG MIT BESCHRÄNKTER HAFTUNG, OF UERDINGEN-ON-THE-RHINE, GERMANY.

PROCESS FOR THE REMOVAL OF WATER FROM COLLOIDALLY-DISSOLVED SUBSTANCES SUCH AS CRUDE PEAT, COAL SLUDGE, AND THE LIKE.

No Drawing.   Application filed May 13, 1922.   Serial No. 560,709.

*To all whom it may concern:*

Be it known that I, HEINZ HORST, a subject of the German State, residing at Uerdingen-on-the-Rhine, Germany, have invented a certain new and useful Process for the Removal of Water from Colloidally-Dissolved Substances Such as Crude Peat, Coal Sludge, and the like (for which I have filed applications in Germany dated October 4, 1919, December 27, 1919, and November 26, 1920, and in Holland July 19, 1920), of which the following is a specification and which is an improvement on the invention disclosed in Patent 1,143,497, granted to H. Brune June 15, 1915.

The present invention relates to a process for the removal of water from colloidally dissolved substances, such as crude peat, coal sludge and other industrial waste products.

The difficulties which stand in the way of the removal of water from products of this kind are due to the fact that the solutions are colloidal and that the water cannot be withdrawn directly by mechanical power in the usual manner. This is particularly the case with peat, in which the amount of water contained in its original state amounts to 90 per cent and more. This high content of water, the removal of which hitherto presented an unsolved problem, was the factor which prevented a large industrial yield.

In crude peat the water forms the "liquid phase" and the peat substance the "solid phase" which is contained therein in an extremely finely divided form and therefore is in contact with the "liquid phase" over an enormous extent of surface area.

The conditions are the same in the case of coal sludge, particularly in the case of wet sludge, that is to say sludge which has not yet settled and which is formed as a waste product in the preparation of coal (coal washing). This is, however, the reason for the difficulties which have to be overcome in the separation of the liquid from the dissolved substances, that is to say in the removal of the water.

Ignorance of the behavior of colloidal substances of this kind explains the many failures of those attempts which have been made to effect the separation of peat substances or the solid constituents of coal sludge from water by pressure, centrifugal force or the like.

It appears, it is true, to be the most obvious thing to try the use of presses which have worked satisfactorily in the case of other substances rich in moisture, as in the case of the treatment of husks or roots. It is, however, only recently that it has been possible through the further development and intensive study of the chemistry of the colloids to get an insight into the real conditions and more to realize the futility of the methods heretofore adopted. Hitherto attempts were made to explain the failure of the results in the pressing of peat or coal sludge by the theory that the limit to which the substances could be pressed was that at which the externally applied pressure produced such a compression of the outer surface layer that the discharge of the liquid from the interior of the mass of material pressed was mechanically obstructed thereby.

In opposition to this view it can be held that in such presses light moss peat (a material which only differs from well decomposed heavy burning peat by a small quantity of coloidal substances) can be pressed to a considerably higher degree.

It must therefore be always borne in mind that no pressure, however great, attained by mechanical means, attains the force of molecular attraction which acts between the liquid and solid phases where the colloidal state exists. Their separation is only possible by forces acting in the same manner, that is to say forces which are capable of acting on the colloidal state.

Starting from this principle, that is to say from the recognition that it is necessary to act on the colloidal state in order to carry out the removal of the water to an extent which corresponds to practical requirements, it has already been proposed to mix solid additional substances such as coke breeze, peat dust, sand, iron filings and the like with the crude peat, coal sludge or the like for the purpose of acting on the colloidal state. This process was only partially successful because owing to ignorance of the effects of the quantity and size of grain of the additional substances the right procedure was not discovered so that the removal of the water was not complete.

According to the mode of carrying out the process it is intended to use for the destruction of the colloidal state added substances, whether porous or non-porous, in a fine state of subdivision. At the same time the addition of such substances per se is admitted to be known for the removal of the water from crude peat or coal sludge. It has, however, not been known hitherto on what the efficiency of these additions depended and consequently even when they were used certain circumstances were not taken into account the consideration of which is of paramount importance for the economy of the process.

A characteristic feature of typical colloids is the absorption of the "finely divided material" by porous substances. Thus, for example, humic acid can be separated from its colloidal solution by means of wood charcoal. This precipitation is naturally a purely physical process, as the porous particles merely absorb the divided phase.

Something similar is attained by the known addition of porous substances to peat colloid. Coke breeze or finely divided dry peat absorbs the "dispersed" peat material and precipitates it. By this means a disturbance in the concentration of the peat colloids is produced. The absorbed particles of peat have lost their "spheres of activity" that is to say their enormous surface area with which they are in contact with the dispersion agent, namely the water. The addition therefore causes destruction of the colloids. The particles absorbed by the porous substance become coagulated with each other and the water which was previously held by these particles is in a free state.

Whereas water can only be removed from untreated peat in a crude state by the expenditure of enormous mechanical forces with long continued pressure and in difficult circumstances, involving for instance, the use of filter cloth, the removal of the water can now be effected with quite a small expenditure of time and pressure in presses, the walls of which are provided with comparatively large openings for the removal of the water.

The foregoing remarks show that the amount of water contained in crude peat or coal sludge (that is to say the concentration) plays no part in the application of the process. The sole important point is the selection of an addition of a certain degree of porosity and a certain size of grain. Its nature therefore plays the principal part. The greater the number of particles of the dispersed phase that are adsorbed by it, the fewer remain in the colloidal state and the greater is the amount of water removed. A definite quantity of the addition, the porosity of which is given and the size of the grains whereof is determined by the manner of manufacture, will therefore give, in the case of the same crude peat, always the same final water content which may fluctuate within certain limits, presuming that the pressing is carried out with a determined final pressure. The experiments which have been made have proved the accuracy of these observations.

As in a crude peat of given origin with a more or less large content of water the same quantity of dispersed particles are taken up, the same quantities of porous particles in this case will cause an equal number of dispersed particles to be adsorbed. The condition or state of the separate mixtures must be regarded as that of a colloid and differentiated from each other as regards the concentration. In the case of peats which contain a large content of water more water will be expressed initially under slight pressure than in a peat which contains less water. In consequence the first product will also require a somewhat longer time for the removal of the water. If it be desired to curtail this time it suffices slightly to increase the quantity of the added substance. This again causes the more dispersed particles to be precipitated so that therefore a still larger volume of water is set free. It flows more easily and more rapidly than in the case of the water set free by the quantity of added substance at first used.

It will be observed from what has been stated that a definite quantity of a porous substance of constant physical quality is necessary in order to obtain a definite water content with a fixed final pressure from a particular crude peat the amount of water contained in which may vary but the colloidal state of which is, however, fixed as regards the number of particles in the dispersed phase. The more surface area possessed by the added substance the less of such substance needs to be added. The quantity of the addition to be added to the peat to be de-watered cannot be given by a definite proportion that applies for all cases, any more than it is possible to state the degree of porosity in the choice of the porous additional bodies. The condition of the raw peat shows the most diverse structures which depend upon the degree of disintegration.

To break down the colloid state raw peat, the additionad substance, is added in such quantity and in particles of such size that by the addition the solid colloidal substances present are adsorbed. The breaking down of the colloids results from the additional substances enveloping the colloids and adsorbing the particles of peat of the "solid phase", that is to say the peat substance which surrounds in the finest state of division the particles of water is concentrated, whereby the water is freed, the greater the superficies of the separate particles of the additional substance, the greater is the adsorption of the peat substance as will be at once clear. In practice there is a limit to the possible reduction of the added substance, because the smaller the separate particles of the added substance, the greater becomes the liability of hindering the removal of the freed water. If the reduction were carried too far the tiny channels formed by the added substance would be very much reduced in dimensions. Accordingly, while observing the conditions produced in different cases such a condition must be kept in mind. It has been found by experience that the size of the grains or particles of the added substance must not be under 0.1 mm. as it has been found by experiment that smaller grains or particles practically prevent the pouring off of the water.

The porosity is of secondary importance. It has an influence on the practical carrying out of the process in so far as the tiny passages of the porous material increase the effective superficies in the separate particles of the added substance and is of influence upon the quantity of addition to be chosen.

It is important to observe that the effect of the added substances is the more favourable the greater the absolute development of their surface area, that is to say in other words the more finely subdivided the added substance. In consequence the quantity of the added substance can be comparatively smaller according to the degree of fineness of sub-division.

The kind of additional substance used will depend therefore on the nature of the solution or the sludge from which the water is to be removed.

The coagulating action required by the process can be produced by subjecting the crude peat or the wet coal sludge to a mechanical treatment, for example, prior to the admixture of the additional substances.

Such treatment will consist, for example, in subjecting the mass to centrifugal action although there is no question of any removal of water during the centrifugal treatment itself. Another method which might be adopted is a movement of the mass after the manner of the preparation of butter from milk. In both cases the solid phase is coagulated by this kind of mechanical treatment.

I claim:

1. Process for the removal of water from colloidally dissolved substances, such as crude peat, coal sludge and the like by the admixture of additional substances of porous and non-porous character in finely divided condition the minimum fineness not to be under 0.1 mm. and in such quantity as to adsorb the colloidal substance present, whereby the water of colloidal substances is freed and may be readily expressed.

2. Process for the removal of water from colloidally dissolved crude peat by the admixture of non-porous dry peat in such quantity and in finely divided grains as to adsorb the colloidally dissolved peat the minimum fineness not to be under 0.1 mm., whereby the water of the colloidally dissolved peat is freed and may be readily expelled with the mechanically mixed water.

3. Process for the removal of water from colloidally dissolved substannces by the admixture of additional substances characterized by the use of a quantity of the substance under treatment previously dried and in a finely divided condition the minimum fineness not to be under 0.1 mm. so that the colloidal substances present are adsorbed by the addition, whereby the water of the colloidally dissolved substances is freed and may be readily expressed with the mechanically mixed water.

4. Process for the removal of water from colloidally dissolved substances, such as crude peat, coal sludge and the like, by the admixture of additional porous and non-porous substances in a fine state of sub-division the minimum fineness not to be under 0.1 mm. and in such quantity as to adsorb the colloidal substances and free the colloidal water and mechanically expelling the freed colloidal water.

5. Process for the removal of water from colloidally dissolved crude peat by the admixture of additional substances, characterized by the employment of non-porous dry peat in a finely divided condition the minimum fineness not to be under 0.1 mm. and in such quantity as to adsorb the colloidal substance and free the water thereof, and expressing the free colloidal water and mechanically admixed water.

6. Process for the removal of water from colloidally dissolved substances, such as crude peat, coal sludge and the like, consisting in coagulating the solid phase by mechanical treatment and admixing additional substances in a finely divided condition the minimum fineness not to be under 0.1 mm. and in such quantity so that the colloidal substances present is adsorbed by the addition and the colloidal water freed.

7. Process for the removal of water from colloidally dissolved substances, such as crude peat, coal sludge and the like, consisting in coagulating the solid phase of the colloidally dissolved substances by mechanical treatment and the admixture of additional substances in such quantity as to adsorb the colloidal substance and free the colloidal water the minimum fineness of the additional substances not to be under 0.1 mm., and expressing the freed colloidal water and the mechanically mixed water.

HEINZ HORST.